United States Patent [19]

Pierce

[11] Patent Number: 4,643,370
[45] Date of Patent: Feb. 17, 1987

[54] WHEELED VEHICLE FOR STRINGING A CABLE

[76] Inventor: Wayne Pierce, 393 W. River Rd., Orange, Conn. 06477

[21] Appl. No.: 707,646

[22] Filed: Mar. 4, 1985

[51] Int. Cl.⁴ ........................ B65H 75/42; H02G 1/00
[52] U.S. Cl. .............................. 242/86.7; 254/134.3 R
[58] Field of Search ............ 242/86.7, 86.5 R, 86.51, 242/54 R, 155 BW; 254/134.3 R, 134.3 FT, 254/310, 321, 356, 378; 212/159

[56] References Cited

U.S. PATENT DOCUMENTS

| | | | |
|---|---|---|---|
| 3,226,087 | 12/1965 | Eitel | 242/86.7 X |
| 3,232,558 | 2/1966 | Barkley et al. | 254/134.3 R |
| 3,319,935 | 5/1967 | Eitel et al. | 254/134.3 R |
| 3,380,545 | 4/1968 | Kemper | 242/86.51 X |
| 4,427,121 | 1/1984 | Clements | 212/159 X |
| 4,454,999 | 6/1984 | Woodruff | 242/86.7 X |

Primary Examiner—John M. Jillions

[57] ABSTRACT

A vehicle for stringing cable from a spool. A motor may be used to rotate the spool, and a multibrake system may be used to inhibit the rotation of the spool. The brake system includes a variable, light resistance brake capable of being activated when the vehicle is either moving or parked and includes a nonvariable, strong resistance brake capable of being actuated only when the vehicle's parking brakes are used. When the strong resistance brake is applied and thereafter the motor is used to rotate the spool to take in or pay out cable, the strong resistance brake is automatically disengaged during such rotation and is automatically reapplied when such rotation ceases.

5 Claims, 19 Drawing Figures

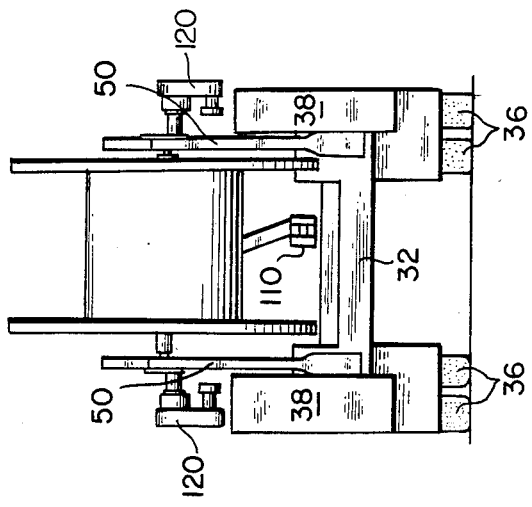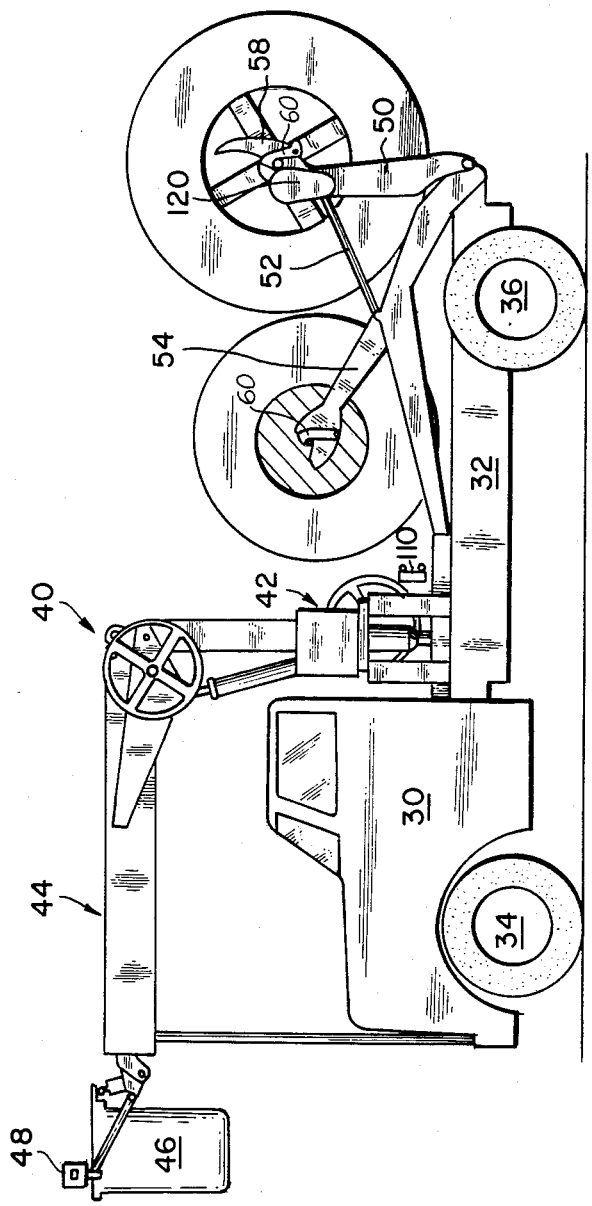
FIG. 1
FIG. 2

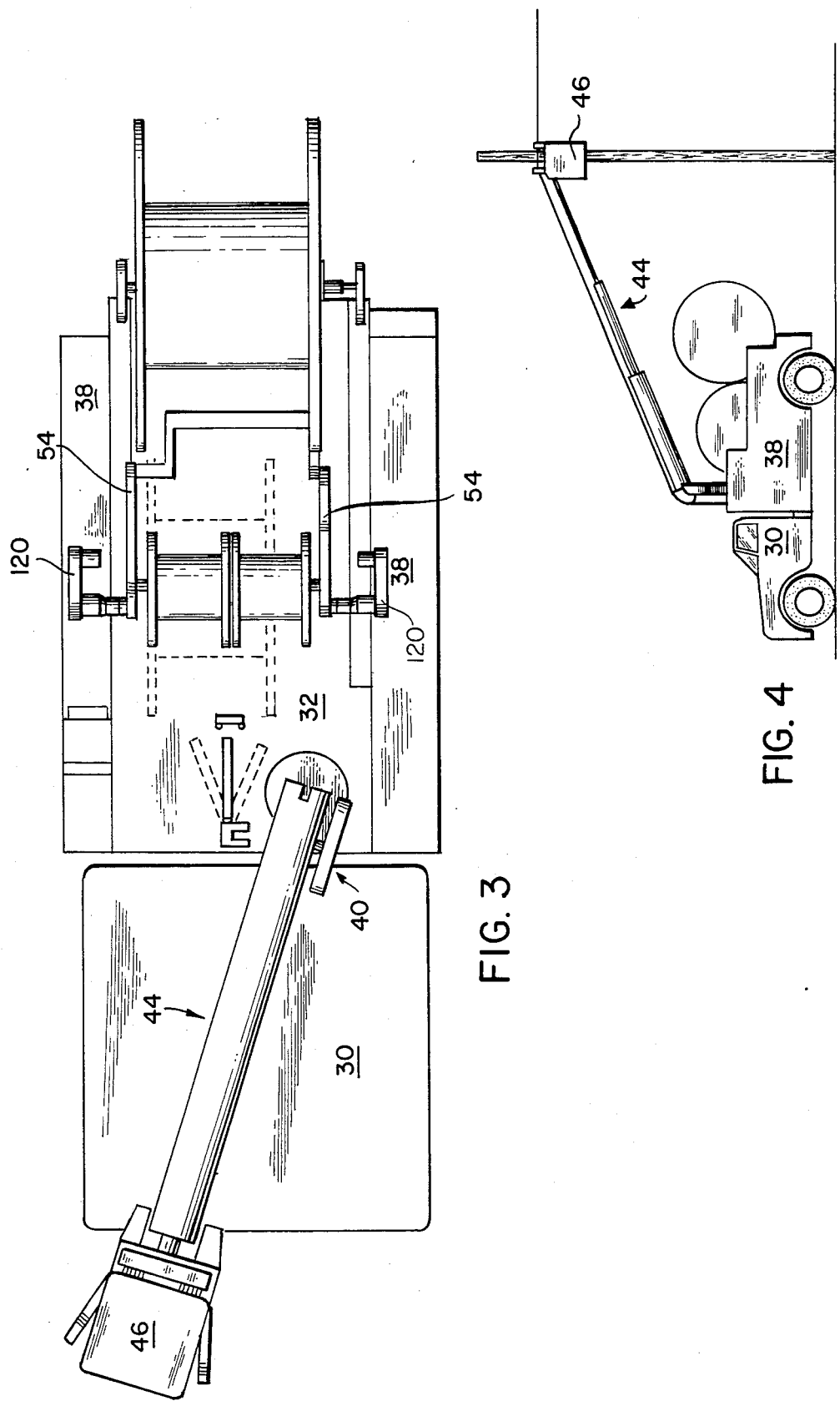

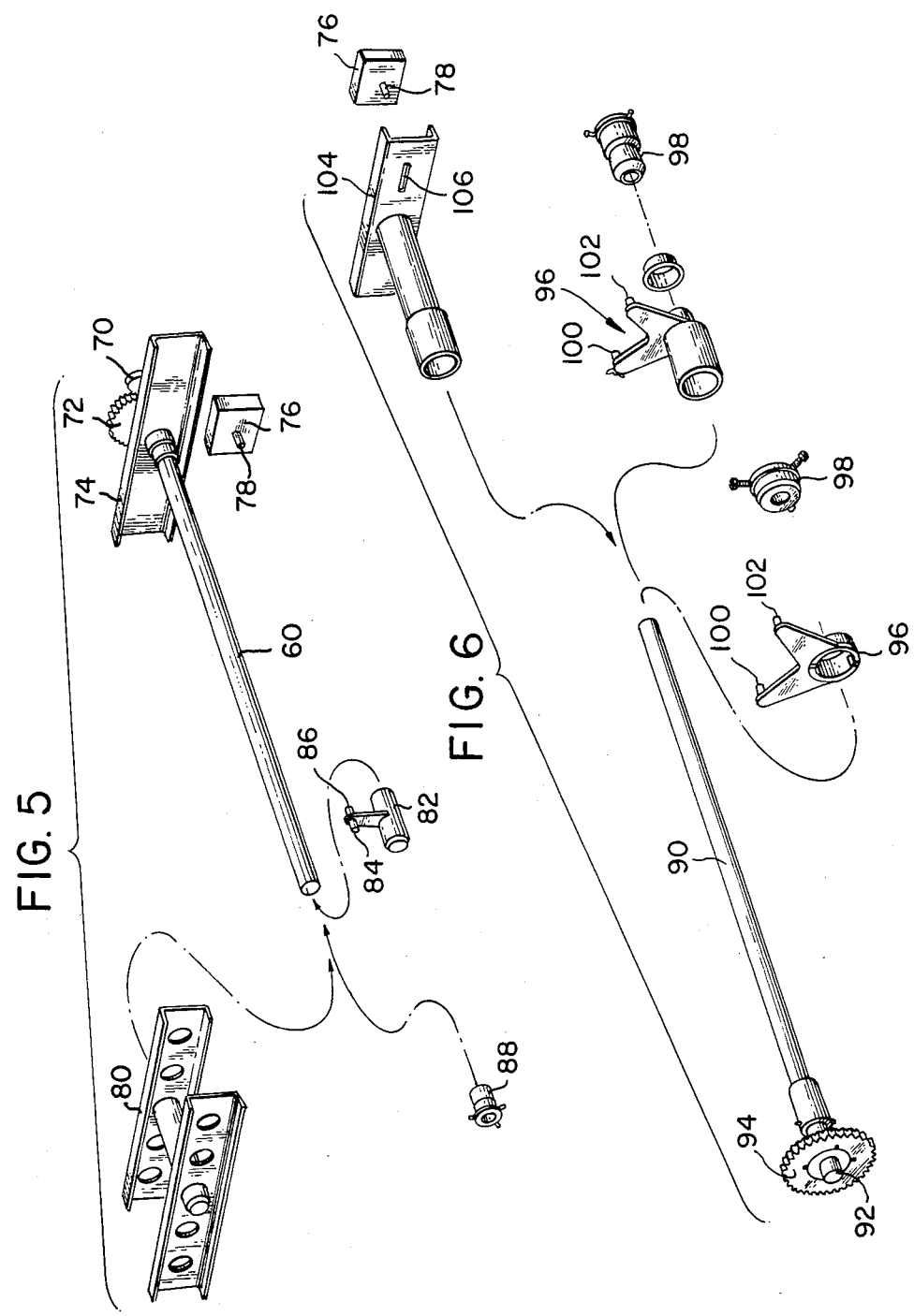

WHEELED VEHICLE FOR STRINGING A CABLE

The present invention relates to a vehicle for stringing cable from a spool and particularly to a system and method of providing a desired tension on the cable as it is being strung.

Many different kinds of vehicles have been used to string cable along the ground or along upstanding poles. These vehicles are often equipped with an extendible ladder or a bucket mounted on an extendible boom to aid the stringing of the cable between upstanding poles and the attachment of the cable to said poles. Commonly, the cable is wound on a spool mounted on a platform or bed of the vehicle. Also, the spool or additional spools may be mounted on a trailer towed by the vehicle.

One of the problems encountered during the stringing of cable is the difficulty of feeding cable from the spool while at the same time maintaining an appropriate tension on the cable. This problem is particularly acute when multi-strand cable is utilized and wire, cable and the like from several different spools are intertwined as they are being strung.

A serious problem has been encountered in the application of appropriate different tensions on the cable when it is being strung from a moving vehicle or worked upon during the time when the carrying vehicle is stopped.

Another problem which has been encountered involves the difficulty in providing appropriate tension to the cable after it is strung.

The present invention relates to equipment for loading and supporting one or more spools of cable on the vehicle. Importantly, it relates to a braking system utilized to provide a tension on the cable as the vehicle is moving and when it is parked, as well as when it is fed from or retrieved onto its associated spool.

SUMMARY OF THE INVENTION

A vehicle for stringing cable from a spool is provided with two pairs of arms for loading and supporting a spool of cable or the like. One pair of arms is pivotably mounted on the rear of the vehicle. The other pair of arms is also pivotably mounted on the vehicle, forward of the first pair of arms. A spool is rolled along the ground, over the free ends of the rear arms. The rear arms are pivoted to raise the spool or spools upwardly, the spool is transferred to the free ends of the forward arms, which support the spool in selective automatic engagement with the brake and drive mechanism. The rear arms may load and simultaneously support a second spool or spools selectively automatically engaging the brake and drive mechanism.

An "L" shaped bar may be used to retain a spool against an associated pair of arms on both the forward and rearward pair. The "L" bar of the forward retainer is automatically engaged and disengaged.

A motor may be used to rotate the spool, and a multibrake system may be used to inhibit the rotation of the spool. The brake system includes a variable, light resistance brake capable of being activated when the vehicle is either moving or parked and includes a non-variable, strong resistance brake capable of being activated when the vehicle's parking brakes are used. When the strong resistance brake is applied and thereafter the motor is used to rotate the spool to take in or pay out cable, the strong resistance brake is automatically disengaged during such rotation and is automatically reapplied when such rotation ceases. Also when the light resistance brake is utilized, the drive motor is automatically disconnected from the brake drive system.

One of the primary features of the present invention is the automatic means provided while the cable is being loaded which prevents injury to the worker.

BRIEF DESCRIPTION OF THE DRAWINGS

The invention will be described with reference to the accompanying drawings. However, it will be understood that such description is merely to facilitate an understanding of the invention and is not in any way limitation on the scope thereof.

FIG. 1 is a schematic side view of a vehicle in accordance with one embodiment of the present invention;

FIG. 2 is a schematic rear view of the vehicle shown in FIG. 1;

FIG. 3 is a schematic top view of the vehicle shown in FIG. 1;

FIG. 4 is a schematic illustration of the vehicle shown in FIG. 1 in a operation of stringing cable along an upstanding pole;

FIG. 5 is an exploded, elevational view of a reel rod assembly for use with a cable spool;

FIG. 6 is an exploded, elevational view of another reel rod assembly for use with a cable spool;

DESCRIPTION OF A PREFERRED EMBODIMENT

Figure 8:
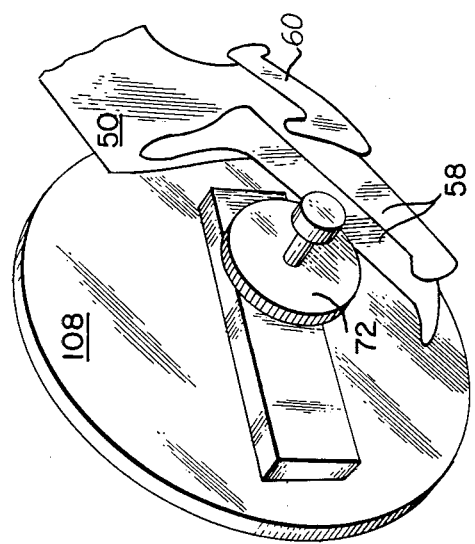
FIG. 8 is a schematic elevational view of a spool with its associated reel rod assembly in contact with the fingers of an arm according to another embodiment of the present invention.

Referring now to the drawing where like reference numerals and symbols refer to the same item, there shown in FIGS. 1 through 3 a vehicle, particularly a truck, according to one embodiment of the present invention. The truck includes a cab 30, a bed 32, a pair of front wheels 34, and two pairs of rear wheels 36. The lateral sides of the bed 32 are each provided with an upstanding wall 38 having compartments and cabinets for containing tools and the like. A conventional aerial extension boom 40 is mounted on the forward end of the bed 32, near the cab 30. The boom 40 includes a turret 42, an extensive boom section 44, and a bucket 46 mounted on the end of the boom section 44. In accordance with the present invention, the bucket 46 is preferably provided with at least one cable roller guide 48.

A pair of laterally spaced rear arms 50 are mounted on the rear end of the bed 32. An end of each rear arm 50 is mounted about a laterally extending axle and is pivotable about an axis coextensive with the axle. A hydraulic piston 52 is operatively engaged with each of the rear arms 50 to pivot the arms 50 within a range of positions where the arms 50 are extending substantially horizontally from below the rear of the truck and can be placed close to the ground so as to enable the loading of smaller reels as well as the larger reels. The arms 50 may be moved to extend generally vertically from the rear of the truck.

The truck is also provided with a pair of laterally spaced forward arms 54. An end of each forward arm 54 is mounted about a laterally extending axle and is pivotable about an axis coextensive with the axle. A hydraulic piston (not shown) is engaged with one of the forward arms 54 for pivoting the forward arms 54 from a postiion where the forward arms 54 are extended rearward at approximately 60 degrees to the horizon to where the forward arms 54 are extending toward the front of the truck and make an angle of approximately sixty degrees with the horizon.

Figure 12:
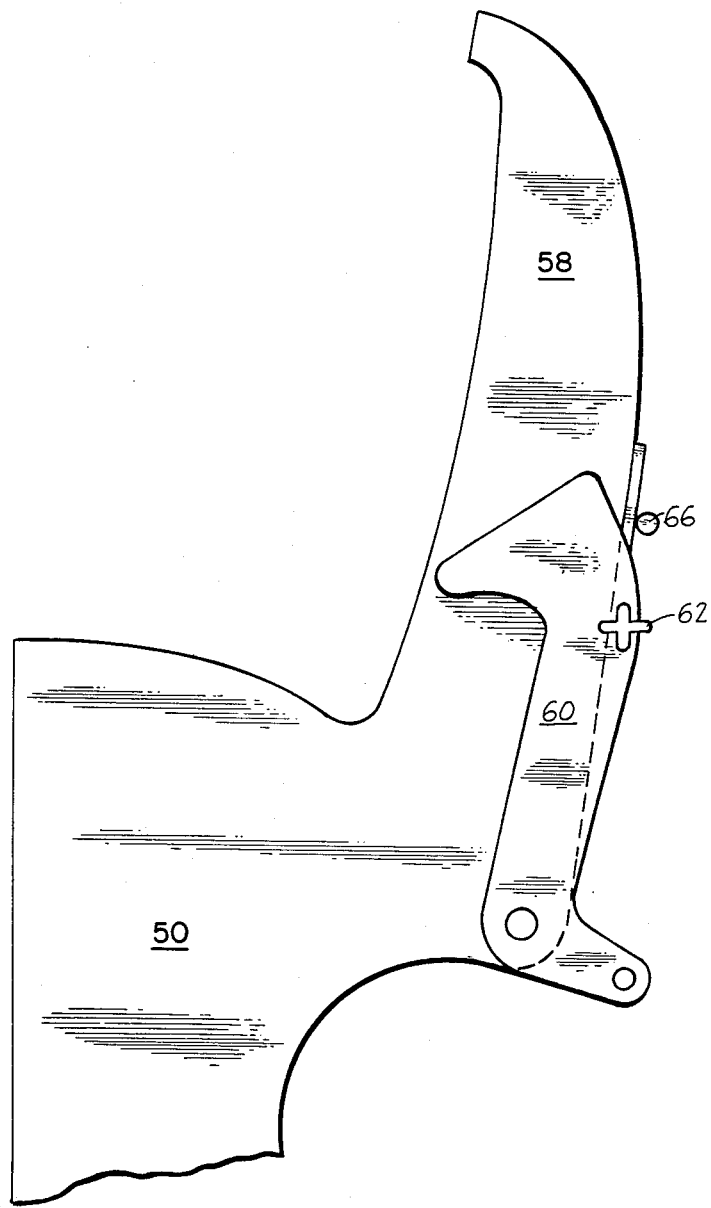
FIG. 12 is a side view of a rear arm end and its associated finger with an "L" shaped retaining bar.
Figure 13:
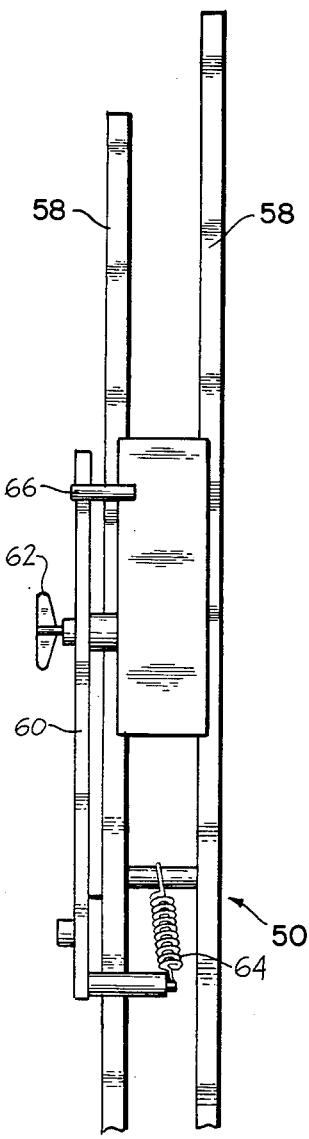
FIG. 13 is an end view of the arm end and its associated finger with an "L" shaped retaining bar shown in FIG. 12.
Figure 14:
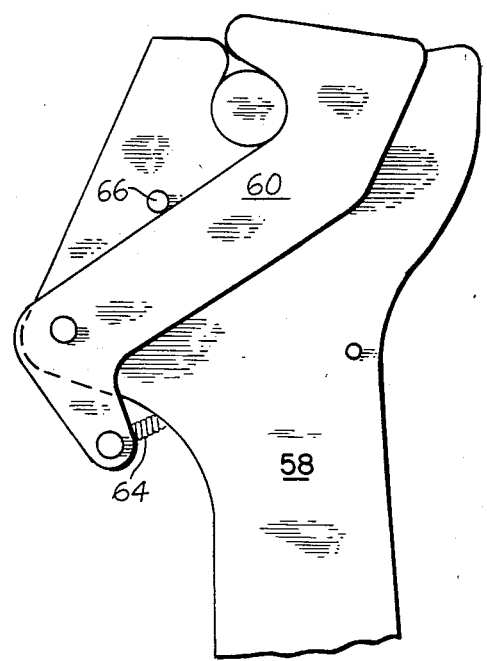
FIG. 14 is a side view of a forward arm end and its associated finger wtih an "L" shaped retaining bar.
Figure 15:
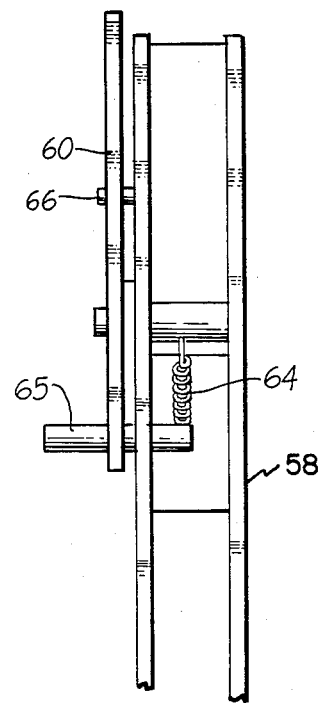
FIG. 15 is an end view of the arm end and its associated finger with an "L" shaped retaining bar shown in FIG. 14.

As best is shown in FIGS. 12 and 13, each of the rear arms 50 is provided with an extending pair of spaced fingers 58. Each of the fingers 58 possesses a slightly crescent shape with a slightly concave inner surface. The region of joinder of the inner surface of the finger 50 and the top surface of the arm 50 is slightly recessed to accommodate and to cradle a rod. An "L" shaped retaining bar 60 preferably is pivotably mounted on each rear arm 50. The "L" bar 60 is positioned and shaped so that the elbow section thereof may overlie a rod cradled in the aforesaid recess. Preferably, the "L" bar 6 may be selectively maintained in such overlying relation by clamping the bar to the finger 58 by means of a knob screw 62. A tension spring 64 connects the arm 50 to the end of the "L" bar 60 to bias the bar 60 toward a non-overlying relation. Movement of the elbow section of the "L" bar 60 is limited by a lug 66 welded to a finger 58. The forward arms 54 are provided with fingers 58 and "L" bars 60 similar in all physical respects to those described but are automatically engaged and disengaged. As shown in FIG. 1, the curvature of the finger on the forward arms 54 is curved in the direction opposite to the fingers 58 of the rear arms 50.

To prepare spools for loading onto the truck, a variety of reel rod assemblies may be utilized, two of which are shown in FIGS. 5 and 6. The reel rod assembly shown in FIG. 5 comprises a rod 60, and guide wheel 70 mounted near the end of the rod 60, a sprocket wheel 72 mounted near the end of the rod near the guide wheel 70, and a "U" shaped cross member 74 fixedly mounted on the rod 60 near the sprocket 72. A block 76 having a cylindrical projection 78 may be fixedly retained long and with the "U" shaped cross member 74. The cylindrical projection 78 of the block 76 is adapted to protrude into a corresponding hole in the side of spool so that the spool rotates with the sprocket 72 and the rod 60. With block 76 removed the "U" shape can engge and overlie a two spoke reel in which the spokes are 180 degrees apart.

If a spool narrower than the length of the rod 60 is mounted on the rod 60, and "H" shaped member 80 can be mounted on the rode 60 to forcefully maintain the spool against the block 76 so that the cylindrical protrusion 78 is always extending into a hole in the spool. If more than one spool is mounted on the rod 60, a drive transfer 82 is provided with two oppositely projecting cylindrical protrusions 84 and 86 for extending into a corresponding hole in a corresponding one of the adjacent spools. The drive transfer 82 ensures that the spools rotate concurrently. The end of the rod 60 opposite to the guide wheel 70 may be provided with a cone 88.

The reel rod assembly shown in FIG. 6 is adapted for use with spools having spokes, such as four spokes extending at 90 degree angles to the adjacent spokes. The reel rod assembly includes a rod 90, a bearing 92 mounted on an end of the rod 90, and a sprocket 94 fixedly mounted near the bearing 92. A pair of "V" shaped adapters 96 may be fixedly mounted on the bar by means of clamps 98. The "V" shaped adapters are provided with a pair of spaced cylindrical protrusions 100, 102 which extend alongside each lateral edge of one of the spokes of the spool. Thus, when the sprocket 94 and the rod 90 are rotated, the rotation is transferred to the "V" shaped adapters to rotate the spool concurrently.

FIG. 6 also shows a device for transferring the rotation of the rod to a wooden spool which is different than that shown in FIG. 5. This device includes a "U" shaped cross member 104 provided with a longitudinally extending slot. A block 76 with the projection 78 similar in all respects to that previously described may be mounted within the "U" shaped member 104 such that the projection 70 extends through the longitudinal slot 106.

Figure 7:
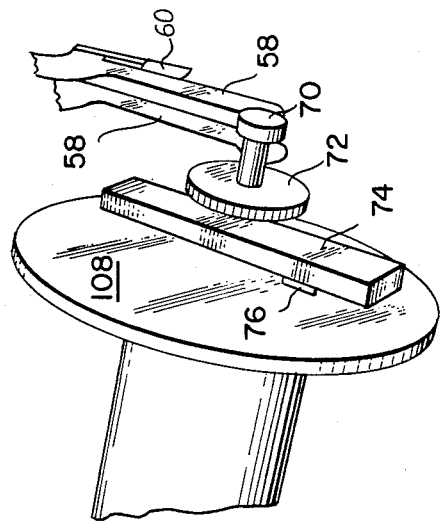
FIG. 7 is a schematic elevational illustration of a spool with its associated reel rod assembly in contact with the fingers of an arm according to one embodiment of the present invention.

FIGS. 7 and 8 show how the rod assembly depicted in FIG. 5 may be utilized with a spool 108. FIGS. 7 and 8 also show a slightly modified version of the finger on the rear arm 50, in which the finger 58 comprises a pair of identical, spaced fingers.

In loading the spool 108 onto the truck, the spool 108 with its associated rod assembly is positioned on the ground, behind the truck. The rear arms 50 are pivoted so that they extend rearwardly and generally horizontally. The spool 108 is rolled toward the arms, such that the rod ends are positioned just above the corresponding finger 58. Preferably, the guide wheel 70 is positioned so that it rests between the spaced fingers 58 of an arm 50. This locates the bar horizontally so that the sprocket wheel 72 engages the spaced fingers 58 in order to maintain the bar in a substantially central position between the fingers. The rear arms 50 are then pivoted toward a vertical position, which causes the guide wheel 70 and sprocket ends to rest within the recess in the concave inner surface of the fingers 58 and the upper surface of the rear arms 50. The forward arms 54 are then pivoted to an upright position where the upper surfaces of the forward arms 54 are generally below the rod cradled in the recess of the rear arms 50. Because of the shapes of the upper surfaces of the arms 50 and 54, pivoting of the rear arms 50 to an upright position causes the rod to be transferred into the forward arms 54. The forward arms 54 then extend generally forwardly rolling the rod and sprocket assembly into engagement with the drive pinion.

If desired, a second spool with its associated rod assembly may be loaded in the same manner by the arms 50, without transferring the same to the forward arms 54.

When a spool and its associated rod are mounted on the rear arms 50 or the forward arms 54 and no loading, transfer, or unloading is anticipated, the spool and its associated rod may be retained in the recess portion of the corresponding arms by means of the "L" shaped bar 60, as previously described. The cable on the spools may be run through a cable guide 110 located near the turret 42 of the extension boom 40. From the turret cable guide 110, the cables may be further guided along the extension boom, to the cable roller guides 48 in the bucket 46. In stringing the cable, it is important to maintain a tension on the cable so that the cable is suspended above the ground, and not tensioned so highly that it could be destroyed or could topple poles. The tensioning means must also respond smoothly to truck pitching and swaying due to an irregular road surface. Existing tension creating systems utilize a variable resistance brake to inhibit the rotation of the cable spools, however, such systems have proven to be insufficiently responsive to the wide range of and sharp changes of resistance necessary in stringing cable.

Figure 11:
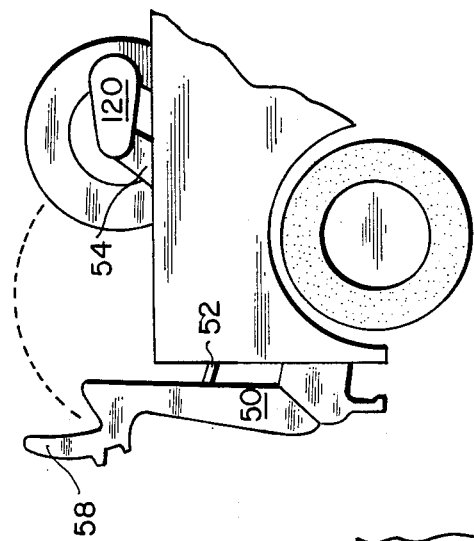
FIGS. 9 through 11 are schematic illustrations of the sequential movement of two pairs of pivotable arms in loading a spool onto a vehicle in accordance with one embodiment of the present invention.
Figure 10:
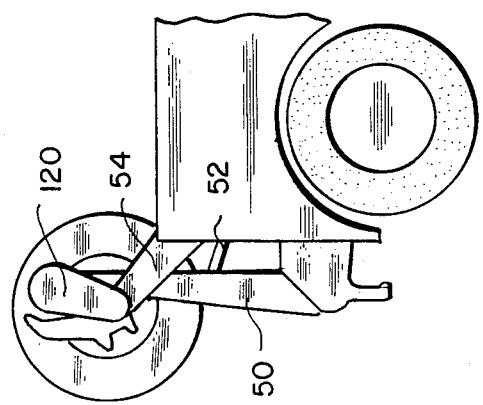
Figure 9:
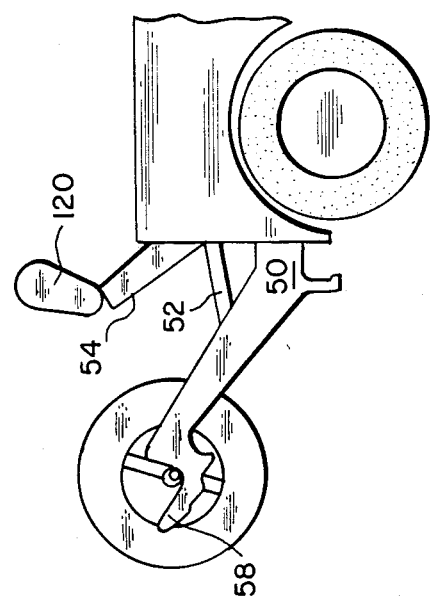

The present invention, in its most important aspects, relates to a motor clutch and brake assembly 120 for controlling the cable feed from the spools. An assembly 120 is mounted on the remote end on a rear arm 50 and of the remote end of a laterally opposing forward arm 54. By positioning the assemblies 120 on laterally opposite sides of the truck, the transfer of a spool from one pair of arms to another pair of arms, as depicted in FIGS. 9 through 11, is not prevented by contact between the assemblies 120.

The motor and brake assembly 120 includes a pinion gear (not shown) for intermeshing engagement with the sprockets 72 and 94 to rotate the rod upon which the spools are mounted. The pinion gear is mounted on the end of an axle (not shown) extending from a gear box 122. The gear box axle is interconnected with a brake drum axle 124 upon which a brake drum 126 is fixedly mounted. The motor and brake assembly also includes a motor and clutch assembly 128 having a drive shaft. A first pulley wheel is fixedly mounted on the drive shaft and is operatively connected to a second, larger pulley wheel 130 fixedly mounted on the end of the brake drum axle 124 such that rotation of the drive shaft is transmitted through the brake drum axle 124 and through the gear box axle to concomitantly rotate the pinion gear.

Figure 18:
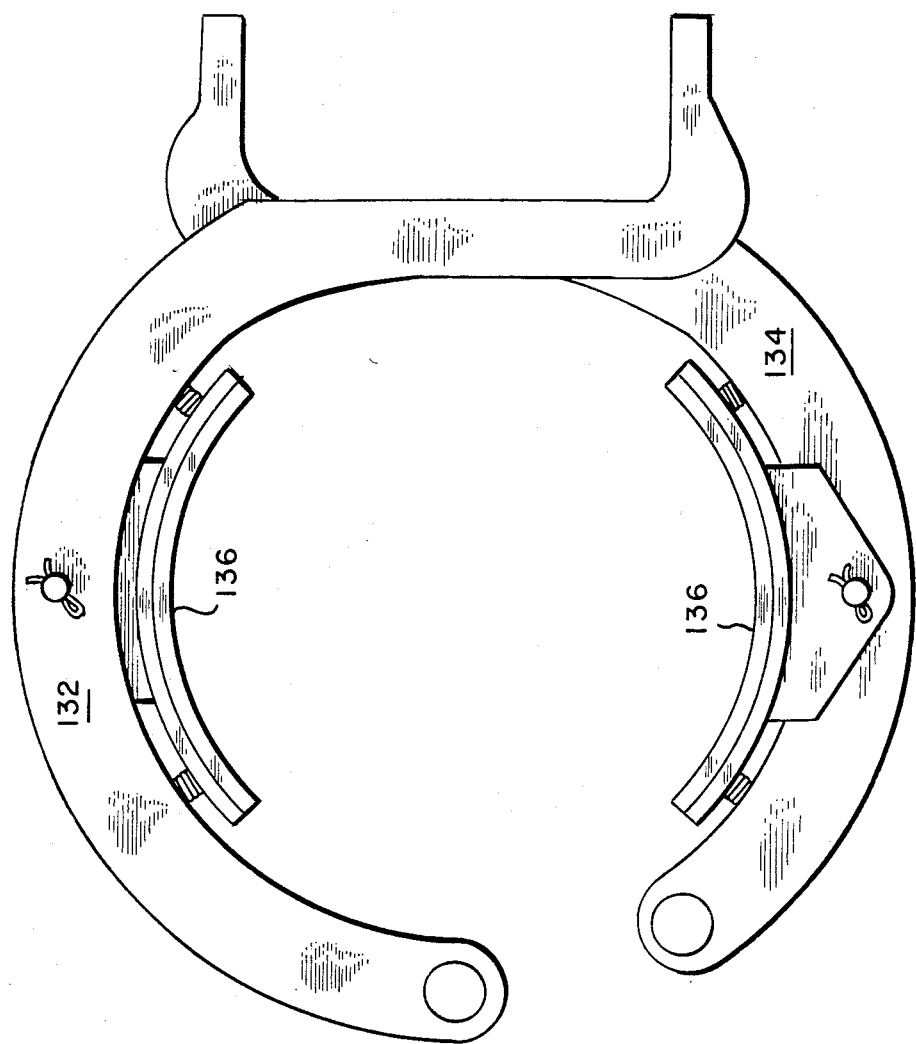
FIG. 18 is a side schematic illustration of the brake pads and brake drum shown in FIG. 16.

An upper caliper 132 and a lower caliper 134 are pivotably mounted around different arcuate portions of the brake drum 126, as best shown in FIG. 18. Mounted on each caliper 132, 134 between the caliper and the brake drum 126 is a corresponding brake shoe 136. Each brake shoe 136 is adapted for frictional engagement with the periphery of the brake drum 126 when the corresponding caliper is pivoted in a selected direction.

The motor and brake assembly 120 further includes a stationary bracket 138 having an upper diaphragm actuator 140 mounted on the upper side thereof and a lower diaphragm actuator 142 mounted on the lower side thereof. The actuators 140, 142 are interposed between the free ends of the calipers 132, 134. The diaphragm of the upper actuator 140 is connected to the free end of the lower caliper 134 such that pressurization of the upper actuator 140 causes the diaphragm therein to deflect, which in turn displaces the free end of the lower caliper 134 and causes the lower caliper 134 to pivot. Similarly the diaphragm of the lower actuator 142 is connected to the free end of the upper caliper 132 such the pressurization of the lower actuator 142 causes the diaphragm therein to deflect, which in turn displaces the free end of the upper caliper 132 and causes the upper caliper 132 to pivot. Thus, by regulating the pressurization of each actuator 140, 142 the frictional engagement of each of the brake shoes 136 with the brake drum 126 can be regulated. The degree of frictional engagement of each brake shoe 136 with the brake drum 126 is inversely proportional to the ease with which the pinion gear may rotate.

One of the actuators 142 is pressurized so that a relatively light and preferably variable frictional engagement is produced between the actuator's associated brake shoe 136 and the brake drum 126. The other actuator 140 is selectively pressurized so that a relatively strong frictional engagement is produced between the other actuator's associated brake shoe 136 and the brake drum 126. In effect, the motor and brake assembly 120 therefore includes two separately regulatable brakes 136 operating on the same brake drum. Preferably the light, variable resistance brake can be applied at any time, whereas the strong resistance brake 136 can be applied only when the light, variable brake is not applied and only when the vehicle's parking brakes are used. Also, preferably the strong resistance brake 136 is not applied when the clutch is engaged and the motor is running.

Figure 16:
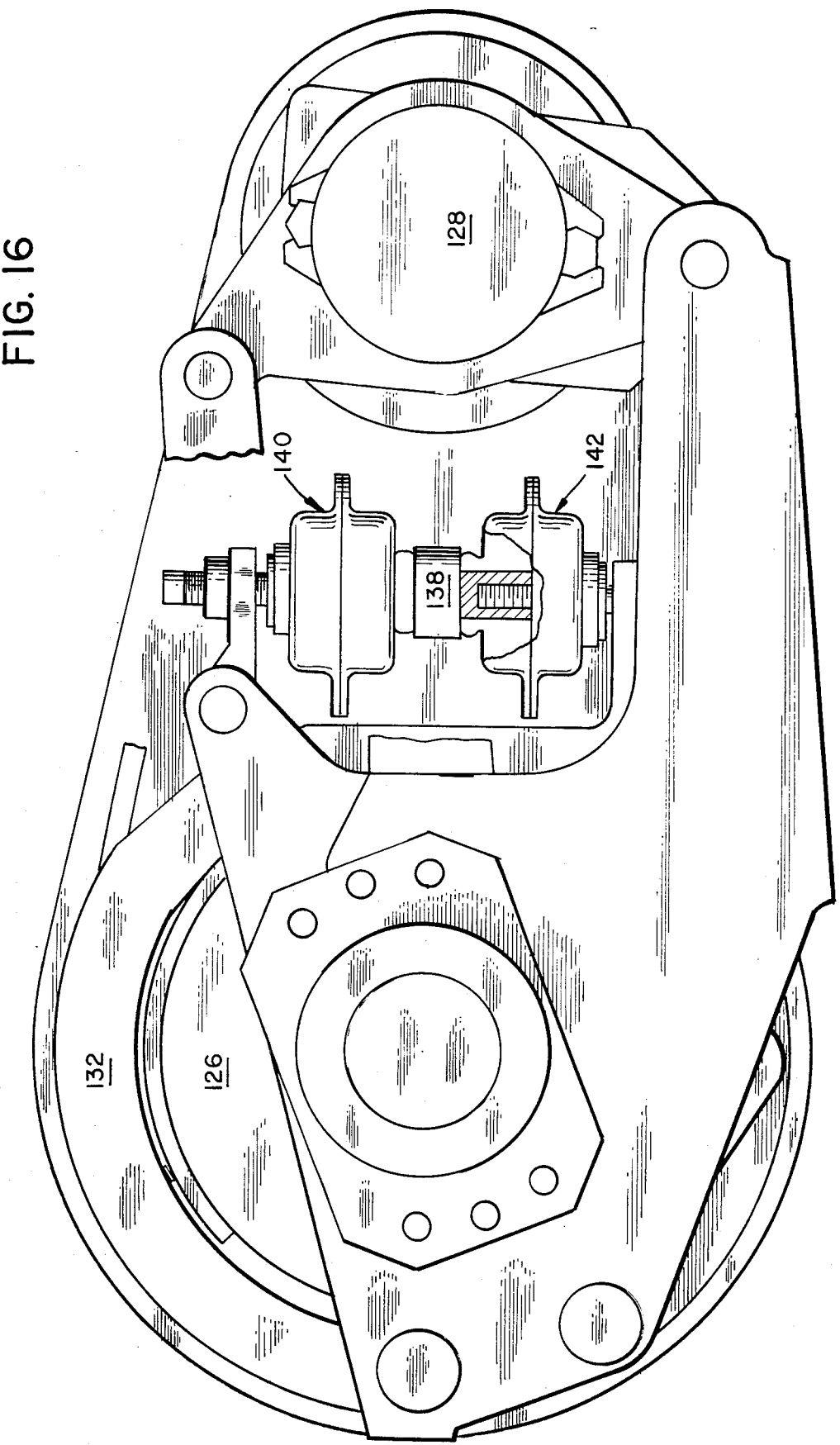
FIG. 16 is a side view of a motor and brake assembly in accordance with one embodiment of the present invention.
Figure 17:
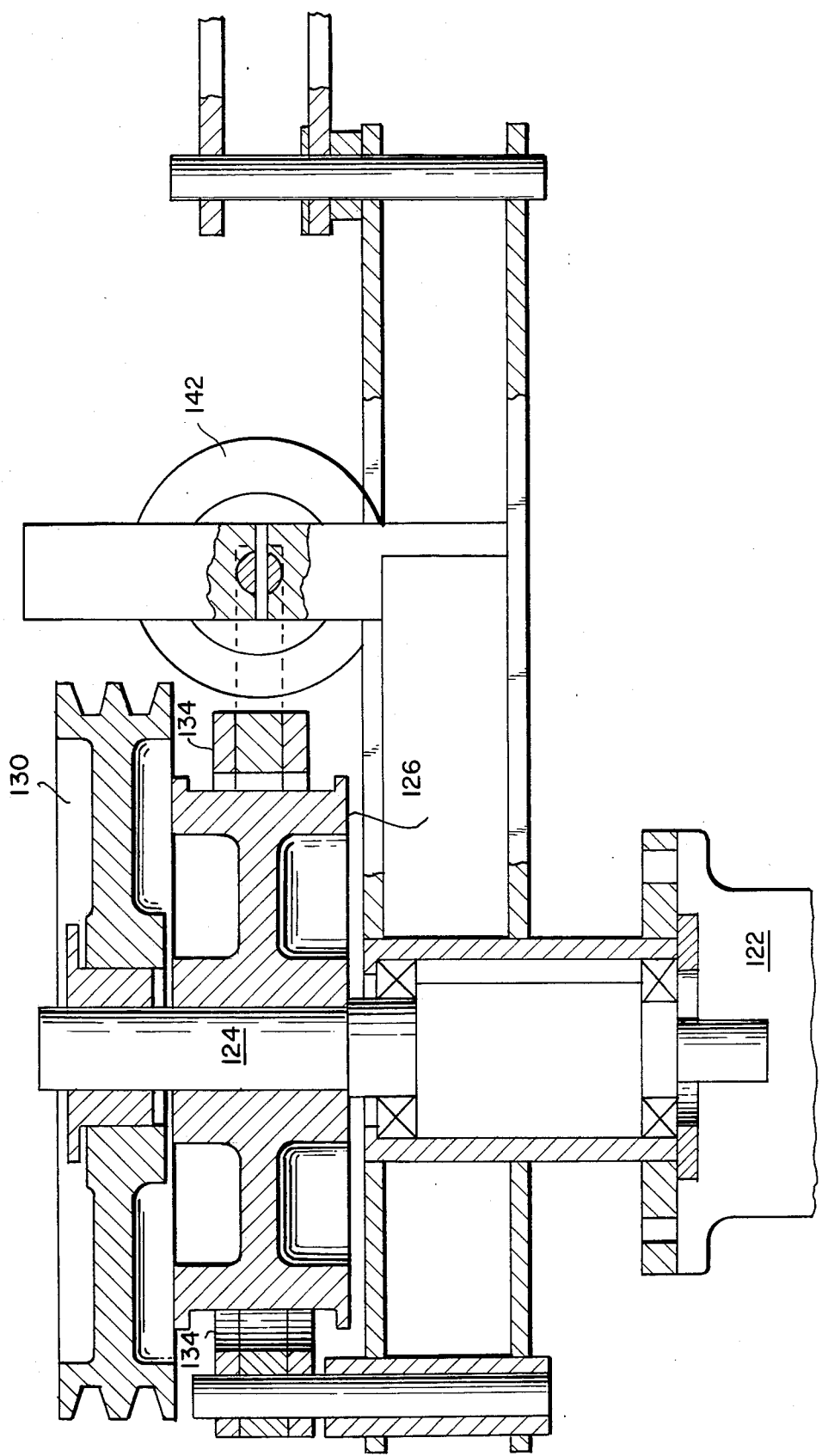
FIG. 17 is a top cross sectional view of the motor and brake assembly shown in FIG. 16.
Figure 19:
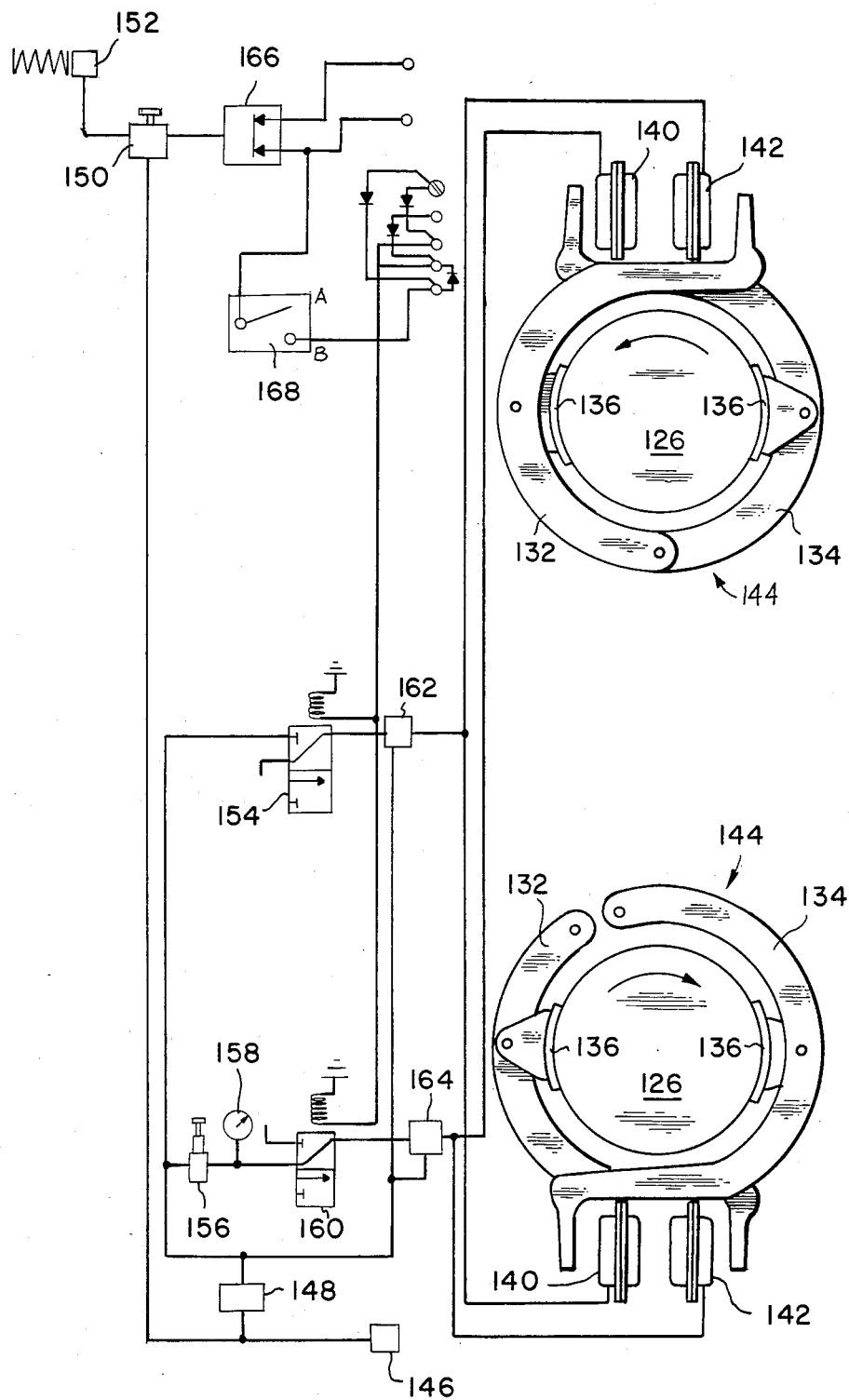
FIG. 19 is a schematic diagram of the actuation system for the brake assembly shown in FIGS. 16 and 17.

There is shown in FIG. 19 an hydraulic (pneumatic) actuation system for the brake assembly shown in FIGS. 16 and 17. With reference to FIG. 19, there is a brake assembly 144 utilized with the spool carried by the forward arms 54 of the vehicle, and there is a brake assembly 144 utilized with a spool carried by the rear arms 50 of the vehicle. Each brake assembly includes a brake drum 126, two brake shoes 136 an upper caliper 132, a lower caliper 134, an upper diaphragm actuator 140, and a lower diaphragm actuator 142. The lower caliper 134 of the brake assembly 144 is disproportionately arcuately longer than its associated upper caliper 132 and is also arcuately longer than the calipers 132, 134 of the brake assembly 144. For the direction of rotation shown since the same pressure is applied to the upper actuators 140, the relative arcuate lengthening of the lower caliper 134 of the brake assembly 144 causes a relatively greater frictional engagement between its associated brake shoe 136 and its associated brake drum 126. Such relatively greater frictional engagement is desirable when, in the normal situation, the forward arms 54 carry a spool smaller than that carried by the rear arms 50.

Pressurized air is supplied from a pressurized air supply 146 through a safety valve 148 selectively to the actuators 140, 142 and through parking brake controller 150 to the parking brakes 152 of the vehicle. The pressurized air from the safety valve 148 can travel essentially along either a first path to the upper actuators 140 or a second path to the lower actuators 142. A first solenoid actuated valve 154 is disposed in the first path to permit the selective communication of the pressurized air with the upper actuators 140. A variable pressure regulator 156, a pressure gauge 158, and a second solenoid actuated valve 160 are disposed in the second path to regulate the pressure of and to permit the selective communication of the pressurized air with the lower actuators 142. A relay valve 162, 164 is also disposed in each of the paths.

The brake systems are spring applied and are held in release position by air or hydraulic pressure. The brakes are applied by releasing air or hydraulic pressure whereby the pressure of the springs is utilized to provide a "fail safe" system.

The parking brake controller 150 communicates with a pressure switch 166 which assumes a closed position when the pressurized air is released from the spring actuated parking brakes 152 to actuate the same. The pressure switch 166 is in series with a manual switch 168 capable of assuming either an open, "A" position or a closed "B" position. When the manual switch 168 is in the A position or when the manual swtich 168 is in the position and the parking brakes 152 are not actuated, the pressurized air travels only along the second path and affects only the actuators 142 so that a light, variable frictional engagement is produced between the brake shoes 136 of the upper calipers 132 and the brake drums 126. When the manual switch 168 is in the B position and the parking brakes 152 are actuated, then pressurized air travels only along the first path and affects only the upper actuators 140 so that a strong, nonvariable frictional engagement is produced between the brake shoes 136 of the lower calipers 134 and the brake drums 126.

The parking brake controller 150, the manual switch 168, the pressure regulator 156 and the pressure gauge 158 are located within the cab of the vehicle, where the driver of the vehicle is normally seated. The vehicle also has a control panel located in the bucket 46 and a control panel located on the side of the vehicle, outside of the cab. The side control panel includes a switch for selecting which one of the control panels is operative. Each of these two control panels includes a switch for regulating the motors of the clutch and motor assemblies so that the associated spools can be rotated to take in or pay out cable. When the strong brake is applied and thereafter the motors are used to rotate the associated spools, the strong resistance brake is automatically disengaged (by means not shown) during such rotation and is automatically reapplied when such rotation ceases. The clutch is automatically disengaged whenever the strong brake is not applied. Thus, the vehicle driver determines whether the light, variable brake or the strong brake is applied, and a person outside the vehicle, next to the side control panel or in the bucket, determines whether to actuate the motor to take in or pay out cable only when the strong brake is applied. The vehicle driver and such person outside the vehicle might communicate by an intercommunication system built into the vehicle by a short wave radio or the like in order to coordinate their actions.

While the brake system of the present invention has been described in connection with a brake shoe and brake drum structure, it will be understood that the system can also be operative with other types of brakes such as disk brakes, plug brakes, magnetic brakes, etc. In this connection, the brake system carried by the wheeled vehicle comprises at least one rotating means operatively connected to the spool and adapted for concurrent rotation with the spool; a first brake means adapted for operative frictional engagement with said rotating means; and a second brake means adapted for selective variable operative engagement with said rotating means.

In the system described wherein for the illustrative purposes only, the rotating means comprises the first brake drum 126, the first brake means comprises the first brake shoe 136 mounted on the lower calipers 134 and engagement with the brake drum. This description however is intended to facilitate an understanding of the invention and is not to be constructed as a limitation thereof.

In operation, the cable is first loaded onto the vehicle and thereafter, the vehicle tranports the spools of cable to a location where the cable is to be strung on a series of spaced poles. The light, variable resistance brake can be applied by the vehicle driver during transit so that the spool does not rotate in response to road bumps, wind and the like. When the vehicle reaches its destination, the light, variable resistance brake is regulated so that there is little or no frictional engagement between a brake shoe 136 and the brake drum and whereby a substantially "free" spool condition exists. A short length of cable is unwound from the spool and appropriately strung through the guides and then onto the first pole. Thereafter, the truck moves to the next pole while the light, variable resistance brake is applied so that a tension in the cable is produced sufficient to maintain the cable suspended above the ground, but not so great as to create undue cable stress or breakage. When the truck is parked at the next pole, the vehicle parking brakes are activated by the driver and the strong resistance brake is automatically applied. If the cable is too slack, the motor and clutch are activated (causing the strong resistance brake to be released automatically) to reel in cable around the spool, whereafter deactivation of the motor causes the strong resistance brake to be reapplied automatically.

Once the cable is appropriately strung on the second pole, the strong resistance brake is released (by deactivating the parking brakes), the light, variable resistance brake is applied, and the vehicle moves to the third pole. It should be apparent that this braking process can be repeated from pole to pole.

Although particular embodiments of the present invention have been described and illustrated herein, it should be recognized that modifications and variations may readily occur to those skilled in the art and that such modifications and variations may be made without departing from the spirit and scope of my invention. Consequently, my invention, as claimed below, may be practiced otherwise than is specifically described above.

I claim:

1. A wheeled vehicle adapted for carrying a spool of cable or the like comprising:
    first means for selectively inhibiting the rotation of the vehicle's wheels when the vehicle is stationary; means for rotating said spool; and second means for selectively inhibiting the rotation of said spool only when said first inhibition means inhibits the rotation of the vehicle's wheels when the vehicle is stationary.

2. A wheeled vehicle according to claim 1 further comprising third means for selectively, variably inhibiting the rotation of said spool.

3. A wheeled vehicle according to claim 2 wherein said second inhibition means and said third inhibition means are both operatively connected to said rotating means and wherein said second inhibition means and said third inhibition means each include a brake drum and a brake shoe adapted for selective frictional engagement with the brake drum.

4. A wheeled vehicle according to claim 3 wherein said second inhibition means and said third inhibition means include a common brake drum and each include a brake shoe adapted for selective frictional engagement with the common brake drum.

5. A wheeled vehicle according to claim 4 wherein said rotating means includes a motor having a rotatable drive shaft and wherein the common brake drum is rotatable and is adapted for concurrent rotation with the drive shaft.

* * * * *